United States Patent [19]

Billet

[11] Patent Number: 4,466,527
[45] Date of Patent: Aug. 21, 1984

[54] CLUTCH RELEASE BEARINGS

[75] Inventor: René Billet, Lamorlaye, France

[73] Assignee: Valeo, Paris, France

[21] Appl. No.: 251,922

[22] Filed: Apr. 7, 1981

[30] Foreign Application Priority Data

Apr. 8, 1980 [FR] France .............................. 80 07812
Jan. 29, 1981 [FR] France .............................. 81 01675

[51] Int. Cl.³ ............................................ F16D 23/14
[52] U.S. Cl. ................................. 192/98; 192/110 B
[58] Field of Search .................... 192/98, 110 B, 99 S;
308/233, 184 A

[56] References Cited

U.S. PATENT DOCUMENTS

| | | | |
|---|---|---|---|
| 3,390,927 | 7/1968 | Adams | 308/135 |
| 3,805,934 | 4/1974 | Labadie | 192/98 |
| 3,815,715 | 6/1974 | Maucher | 308/233 X |
| 3,904,008 | 9/1975 | Sonnerat | 192/98 |
| 4,117,916 | 10/1978 | Baker | 192/98 |
| 4,142,618 | 3/1979 | Fontaine et al. | 192/98 |
| 4,144,957 | 3/1979 | de Gennes | 192/110 B X |
| 4,271,949 | 6/1981 | Guerton et al. | 192/98 |
| 4,371,068 | 2/1983 | Billet | 192/98 |

FOREIGN PATENT DOCUMENTS

| | | |
|---|---|---|
| 2151146 | 4/1973 | France . |
| 2195297 | 3/1974 | France . |
| 2391392 | 12/1978 | France . |
| 1382354 | 1/1975 | United Kingdom . |
| 1441804 | 7/1976 | United Kingdom ................. 192/98 |

Primary Examiner—Rodney H. Bonck
Attorney, Agent, or Firm—Charles E. Brown

[57] ABSTRACT

A clutch release bearing is disclosed comprising a plastic operating member with an axial sleeve and a transverse flange, and a ball bearing defining a drive or thrust member. One of the races of the ball bearing is applied directly or indirectly against a bearing member which comprises a simple flat metal washer. The arms of the associated actuating fork bear against the other side of the bearing member through passages therein. For guiding the arms of the actuating member there are raised edges or projections bordered the passages, possibly with a right angle portion parallel to the flange for engaging each arm of the fork. An axial rim is provided at the outer periphery of the flange extending to the drive or thrust member side and has hooks engageable with a resilient clip for coupling the drive or thrust member to the operating member and if desired self-centering operation. Various arrangements are disclosed to positively hold the bearing member against axial movement in either direction.

25 Claims, 18 Drawing Figures

CLUTCH RELEASE BEARINGS

BACKGROUND OF THE INVENTION

The present invention relates generally to clutch release bearings, that is, devices adapted to be applied against the release mechanism of a clutch, particularly those used in motor vehicles.

As is known such clutch release bearings generally comprise an operating member which is controlled by an actuating member which is generally an actuating fork, a drive or thrust member which is urged by the operating member against the release mechanism of the clutch and coupling means for axially securing the drive or thrust member to the operating member.

In practice the operating member usually comprises a transverse flange on one side of which is mounted the actuating member and on the other side of which bears the drive or thrust member.

The present invention more particularly relates to such clutch release bearings in which the operating member is made of synthetic plastic material. To protect such a plastic operating member from the action of the actuating member which may, on account the contact pressure developed during each clutch disengagement operation, cause rapid deterioration, detrimental to long service life of the release bearing, it is common to provide a special metal bearing member against which the actuating member bears axially. Most often this metal bearing member comprises a plate which overlies the flange of the operating member on the side thereof remote from the drive or thrust member.

PRIOR ART

It has, however, been proposed to dispose the bearing member between the drive or thrust member and the transverse flange of the operating member. Such is the case, for example, in U.S. Pat. No. 3,390,927, French printed patent application No. 2,391,392 and at least some of the embodiments of U.S. patent application Ser. No. 184,629, filed Sept. 8, 1980, assigned to the assignee of the present application, now U.S. Pat. No. 4,371,068 granted Feb. 1, 1983.

In the U.S. Pat. No. 3,390,927 the bearing member to which the actuating member has access through the transverse flange of the operating member, has for this purpose local passages of L-shaped profile necessitated by the fact that since the clutch release bearing is not a self-centering release bearing its drive or thrust member is fitted against radial displacement on a cylindrical bearing surface of the bearing member which must be formed on an axial part of the bearing member.

Other than the fact that such an arrangement is not suited to self-centering operation in which limited radial shifting of the drive or thrust member is provided relative to the operating member in all directions in a plane perpendicular to the axis of the release bearing, it involves the use of a member which is of relatively complex configuration and therefore is all the more expensive as thermal treatment is required to reinforce it against impacts, such thermal treatment not being possible before the part is in its ultimate configuration.

In French printed patent application No. 2,391,292 the bearing member is formed in one piece with one of the components of the drive or thrust member and it therefore has a relatively complex overall configuration thereby increasing production costs.

In above identified patent application Ser. No. 184,629, the bearing member comprises a part separate from the drive or thrust member but for reasons of its particular application, the bearing member has, as above, a relatively complex overall configuration and therefore is relatively expensive to manufacture.

OBJECT AND SUMMARY OF THE INVENTION

A general object of the present invention is the provision of an arrangement which permits these drawbacks to be overcome and provides other advantages as well.

According to the invention, there is provided a clutch release bearing comprising a plastic operating member having a transverse flange and being adapted to be controlled by an actuating member, a metal bearing member engageable with the actuating member, a drive or thrust member adapted to coact a release mechanism of an associated clutch in response to the operating member, coupling means for axially coupling the drive or thrust member to the operating member, the metal bearing member being disposed axially between a drive or thrust member and the transverse flange of the operating member, the transverse flange having discrete access passages providing access to the metal bearing member for the actuating member, the metal bearing member being a substantially flat washer.

This arrangement which is particularly suited to self-centering release bearings, the drive or thrust member therefore admitting limited shifting movement in all directions in a plane perpendicular to the axis in contact with the bearing member, is particularly economical to manufacture and assemble. Indeed, the bearing member is a simple part of any shape which advantageously may be simply cutout of a pretreated blank and therefore does not require subsequent thermal treatment of any kind and has a relative low production cost.

In practice the washer forming the bearing member may, if desired, be absolutely plane or flat. Alternatively, the washer may have one or more local bosses which may be formed at the same time as the washer is blanked out. The bosses extend axially into the corresponding passages of the flange of the operating member for contact with the actuating member and thereby adjust the combined axial length of the release bearing and the actuating member and also fix it against rotation.

Further, when axial guiding is to be provided between the actuating member and the release bearing, such guiding may be easily insured by the operating member which is made of plastic, and which may be simply molded to more or less complex configurations required for guiding. In practice, each passage in the flange of the operating member is provided with an axial projection at least along a part of at least one of its edges. Owing to such an axial projection and on account of it adding to the axial thickness of the flange of the operating member satisfactory guiding of the actuating member results.

Finally, since the actuating member extends through the flange of the operating member to have access to the associated bearing member, the axial thickness of the flange is advantageously not added thereto and therefore not to the combined axial length of the release bearing and the actuating member.

In sum, all conditions being equal, the clutch release bearing according to the invention is particularly compact and economical to manufacture.

For certain applications at least it may be desirable to perfect the axial securement of the washer constituting the bearing member. Indeed, if on the side of the washer remote from the drive or thrust member the axial securement of the bearing member is insured positively by the flange of the operating member such is not the case for the side facing the drive or thrust member where, on the contrary, the axial securement of the bearing member depends on the coupling means axially securing the drive or thrust member to the operating member which usual comprises axially deformable resilient means, particularly in the case of self-centering release bearings for permanently self-centering the same.

Thus, under the action of the actuating member, particularly if this action is not exactly symmetrical with respect to the axis of the assembly, the bearing member may during clutch disengagement be caused to rock to a position slightly tilted with respect to the axis of the assembly so that since drive or thrust member is also tilted it no longer bears in a circularly uniform manner against the release mechanism of the associated clutch to the detriment of the working and operating conditions of the assembly.

According to a further feature it is proposed to associate with the bearing member on the side of the flange of the operating member facing the drive or thrust member axial holding means adapted to insure positive axial securement of the bearing member.

According to a first embodiment, the flange of the operating member having an axial rim at its outer periphery, the axial holding means comprise at least two radial tabs at the outer periphery of the washer which comprises the bearing member. And for each of the tabs there is provided on the axial rim of the flange of the operating member remote from the flange a transverse shoulder axially turned toward the flange for contact with the radial tab. In this case the washer is secured in place by a detenting action.

Alternatively the axial holding means comprise a web formed in one piece with the operating member molded over at least a portion or even the entire bearing member. In this case the washer is positioned in the mold in which the operating member is to be molded.

In any event axial securement of the washer defining the bearing member is positive in both directions so that the washer is prevented from tilting during clutch disengagement and therefore satisfactory operating conditions are insured for the entire assembly.

These and other features and advantages of the invention will be brought out in the description which follows, given by way of example, with reference to the accompanying diagrammatic drawings.

DETAILED DESCRIPTION OF THE PREFERRED EMBODIMENTS

As shown in the drawings the clutch release bearing according to the invention generally comprises, as is known per se, an operating member 10 adapted to be controlled by an actuating member, in practice a clutch actuating fork, of which one of the arms is partially and diagrammatically shown in phantom lines in FIGS. 1, 4, 7 and 8-10, and which is designated by general reference numeral 11, and a drive or thrust member 12 adapted in response to the operating member 10 to act directly on the clutch release mechanism of the clutch, not shown.

In practice, the operating member 10 is made of synthetic plastic material and comprises in one piece an axial sleeve 13 and a transverse flange 14. In the various embodiments the flange 14 is generally annular and has an axial rim 15 at its outer periphery on the side of the drive or thrust member 12.

For bearing engagement of the actuating member 11 a metal bearing member 17 is disposed axially between the drive or thrust member 12 and the flange 14 of the operating member, the flange 14 having local, diametrically opposed pair of passages 18 which will be described in greater detail hereinbelow, the passages 18 providing access to the bearing element 17 for the two arms of the actuating member 11. In the illustrated embodiments the bearing member 17 is flush against the flange 14 of the operating member 10 and overlies the same. However, this is not necessarily the case.

In any event, according to the invention, the bearing member 17 is a simple flat or substantially flat washer, i.e., a simple washer blanked out of a metal sheet without in any way shaping the sheet or blank. Advantageously, the metal blank or sheet undergoes prior treatment, such as, thermal treatment.

In the illustrated embodiments the inner and outer contours of the bearing member washer 17 are both entirely circular. This is not necessarily so, one or both of the contours may include, for example, a flat, or have some different configuration.

In addition, in the illustrated embodiments the bearing washer is centered by its outer periphery on the axial rim 15 of the flange 14 of the operating member 10, but this is not necessarily the case. The centering may, on the contrary, be effected along the inner periphery by the sleeve 13 or on another bearing element which may or may not be circularly continuous.

In the illustrated embodiments the drive or thrust member 12 moreover comprises a ball bearing having an outer race 20 which alone bears against the bearing washer 17 and an inner race 21 totally free from contact with the bearing washer 17. The inner race 21 forms the active part of the drive or thrust member 12, in other words, it is adapted to engage the release mechanism of the clutch itself.

Since, in practice, the clutch release bearing is of the self-centering type the drive or thrust member 12 is displaceable in all directions in a plane perpendicular to the axis of the assembly, in contact with the bearing washer 17, within the limits permitted by the axial rim 15 at the periphery of the flange 14 of the operating member 10.

Finally, the clutch release bearing includes coupling means for axially securing the drive or thrust member 12 relative to the operating member 10. In the illustrated embodiments the coupling means comprises a clip 23 such as disclosed in detail in French printed patent application No. 2,337,281 comprising a plurality of axial tabs or lugs 24, four such tabs or lugs being provided in the embodiments illustrated in FIGS. 1-7, and three in embodiments of FIGS. 8-10, and a front wall 25.

The axial tabs or lugs 24 of the clip 23 attach the clip. Each of the tabs or lugs 24 has an aperture 26 engageable with a hook 28 formed at the end of each axial finger 29 extending axially from the axial rim 15 of the flange 14 of the operating member 10.

The front wall 25 of the clip comprises axially acting resilient means defined by an undulated or corrugated ONDUFLEX washer, "ONDUFLEX" is a trademark for a crinkle or undulated spring washer having circumferential corrugations, the clip 23 is applied against the drive or thrust member 12 and more particularly the outer race 20 thereof and urges it, as mentioned above, against the bearing member 17.

Owing to the resilient action the self-centering is permanent, the drive or thrust member 12 maintains its position with respect to the axis of the release bearing when it is not subjected to any sort of radial component. The material of which washer 50 is made is selected accordingly.

Preferably, for guiding the actuating member 11 each passage 18 in the flange 14 of the operating member 10 has an axially extending raised edge or projection running along at least part if at least one of its edges. In the embodiment illustrated in FIGS. 1-4 such a passage 18 comprises a notch opening on to the outer periphery of the flange 14 defined along its inner periphery by a main edge 30 parallel to the axial plane P of symmetry of the release bearing which is schematically represented by phantom line in FIG. 2, and by two lateral edges 31 extending chordally to the outer periphery of the flange 14, perpendicular to the axial plane P of symmetry. In this embodiment from the main edge 30 extends an axial projection 32 for guiding the actuating member 11, this axial projection 32 therefore extends substantially tangentially to the inner periphery of the flange 14 parallel to the axial plane P of symmetry.

In practice the axial projection 32 comprises at the end of an extension 33 a right angle portion 34 which extends parallel to and spaced from the flange 14 in alignment with the corresponding passage 18 in the flange 14.

As the clutch release bearing is of the type intended to be permanently held in contact with the release mechanism of the associated clutch, the right angle portion 34 suffices, as is known per se, to hook on to the actuating member 11 during cluch disengagement operations.

In use each of the arms of the actuating member 11 bears against the outer surface of the corresponding axial projection 32 which insures correct guiding of the actuating member when it is swivelly mounted.

So as not to interfere with the actuating member 11 in operation, at least one of the lateral raised edges or projections 32 of each of passages 18 in which the fingers of the actuating member are engaged, and in practice, for reasons of symmetry, each of the lateral raised edges or projections 31, has a chamfer 35 as shown.

Figure 1:
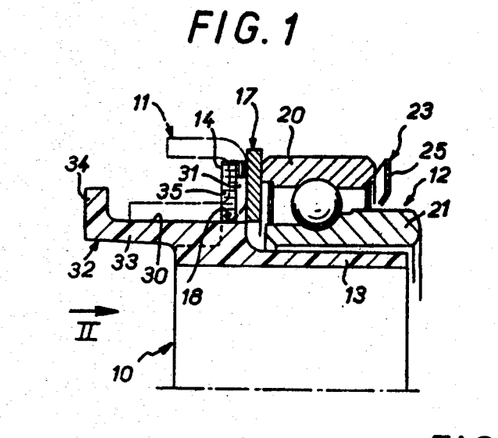
FIG. 1 shows a half longitudinal sectional view of a clutch release bearing embodying the invention, taken along line I—I in FIG. 2.
Figure 2:
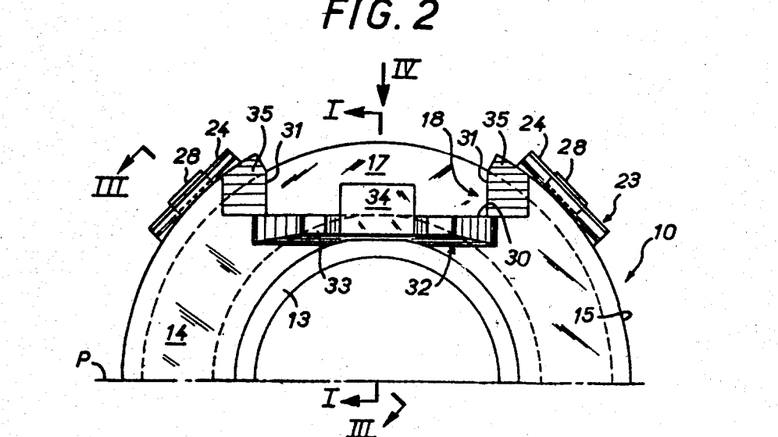
FIG. 2 shows a half elevational view taken in the direction of the arrow II in FIG. 1.
Figure 3:
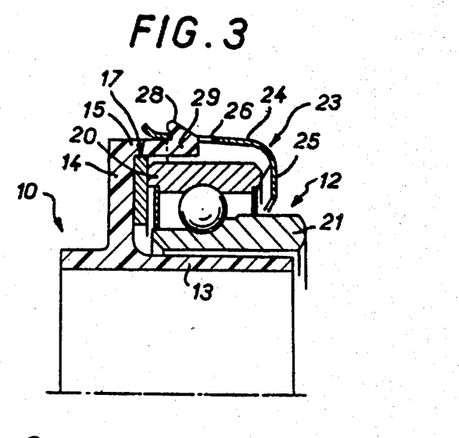
FIG. 3 shows another half longitudinal sectional view taken along line III—III in FIG. 2.
Figure 4:
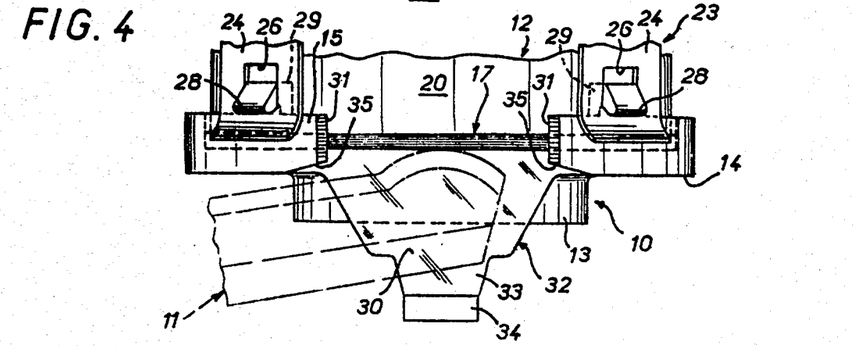
FIG. 4 shows a fragmentary plan view taken in the direction of arrow IV in FIG. 2.
Figure 5:
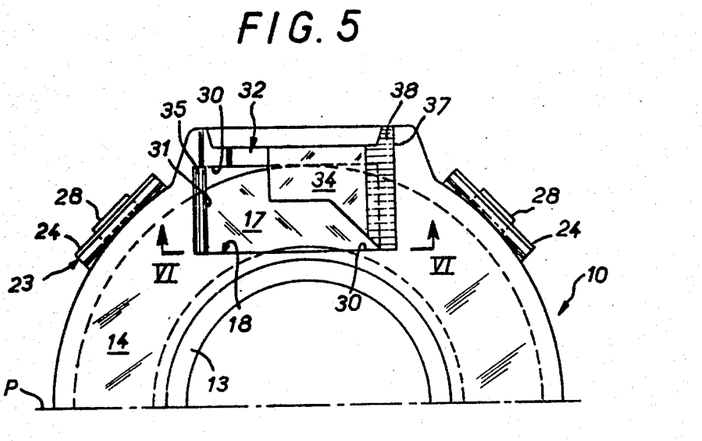
FIG. 5 shows a half elevational view similar to that of FIG. 2 for an alternative embodiment.
Figure 6:
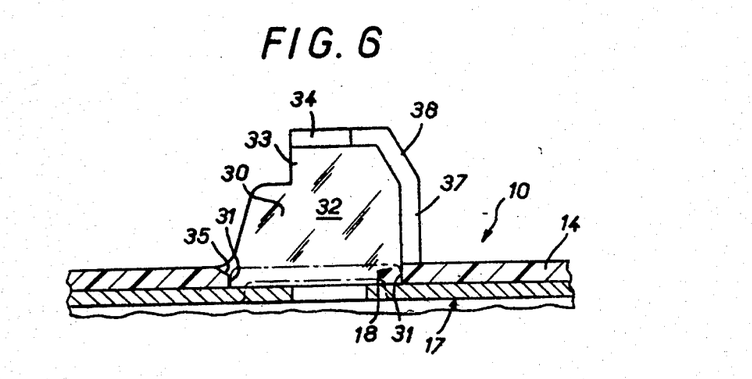
FIG. 6 shows a sectional view of the alternative embodiment of FIG. 5 taken along line VI—VI.

In the alternative embodiment illustrated in FIGS. 5 and 6, each passage 18 in the flange 14 of the operation member 10 forms a closed contour aperture and the axial projection 32 provided for guiding the actuating member 11 borders the main edge 30 of such an aperture which is radially farthest from the axis of the release bearing. The axial projection 32 thus extends substantially tangentially to the outer periphery of the flange 14, parallel to the axial plane P of symmetry of the release bearing.

In the illustrated embodiment each passage 18 of the flange 14 is bordered by such a projection not only along one of the one of its main edges 30 but also along part of at least one of its lateral edges 31. In practice it is the lateral edge 31 located at the end of the arm of the actuating member 11. Thus in this embodiment each passage 18 in the flange is bordered by an axial projection along at least part of at least two of its contiguous edges.

The axial projection of the lateral edge 31 bears reference numeral 37 in the drawings and it extends chordally of the flange 14 perpendicularly to the axially plane P of symmetry.

In practice, according to this embodiment, a connecting wall 38 continuously interconnects the axial projection 37 to the right angle portion 34 of the axial rim 32 bordering the contiguous main edge 30. This provides a rigidification of the operating member.

As above, in the illustrated embodiment of FIGS. 5 and 6, the guiding, in use, of the actuating member 11 is insured by the axial projection 32 of the main edge 30 of the passages 18, this guiding being effected in this case by the inner surface of such an axial projection 32.

Figure 7:
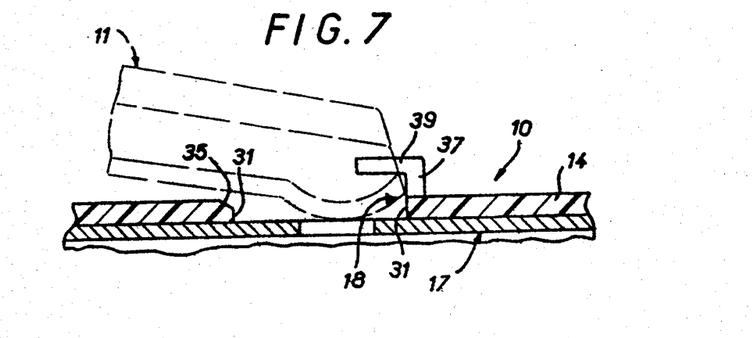
FIG. 7 shows a view similar to that of FIG. 6 for another embodiment.

In the alternative embodiment of FIG. 7 the guiding is insured at the end of each arm of the actuating member 11 by only axial projection 37 of the lateral edges 32 of the associated passage 18. In this case such an axial projection may be reduced. In addition, the right angle portion 39 for hooking on to the actuating member 11 may be engaged between the sides of the corresponding arm of the actuating member 11 when, as shown, and as is conventional, such an arm is of troughlike cross section.

Figure 8:
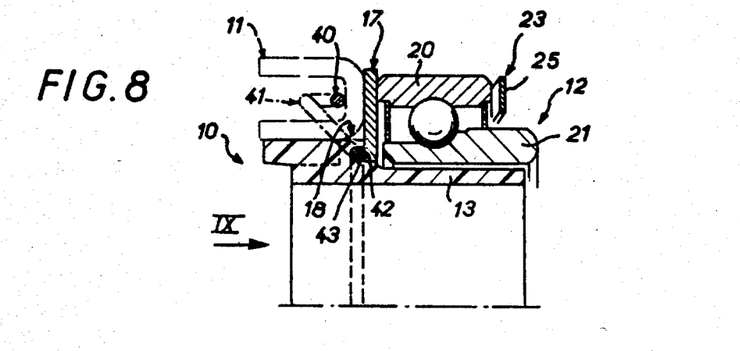
FIG. 8 shows a half longitudinal sectional view similar to that of FIG. 1, relative to another alternative embodiment, taken on line VIII—VIII in FIG. 9.
Figure 9:
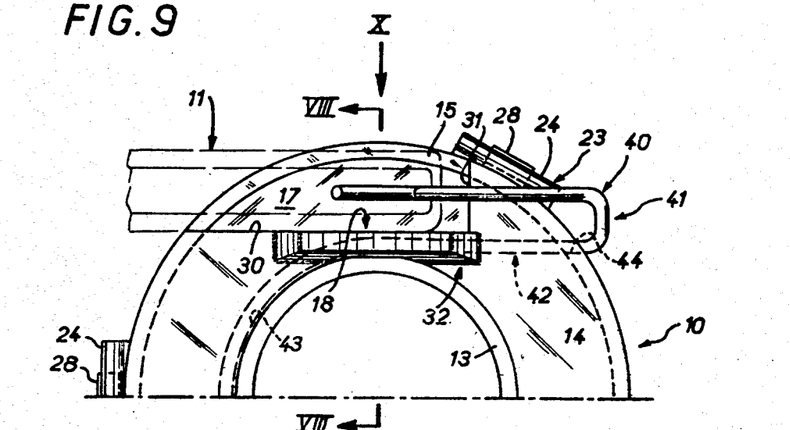
FIG. 9 shows a half elevational view of the alternative embodiment of FIG. 8 in the direction of arrow IX.
Figure 10:
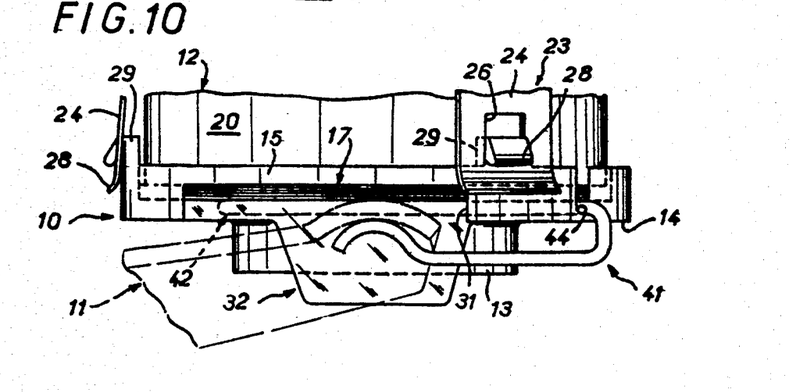
FIG. 10 shows a fragmentary plan view taken in the direction of arrow X in FIG. 9.
Figure 11:
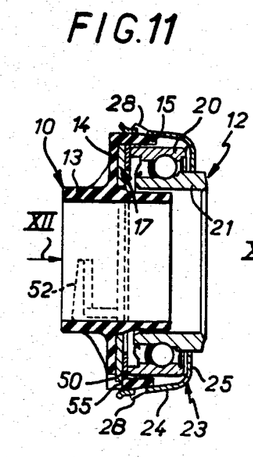
FIG. 11 shows a longitudinal sectional view of an embodiment of a clutch release bearing according to the invention, taken on line XI—XI in FIG. 12.
Figure 12:
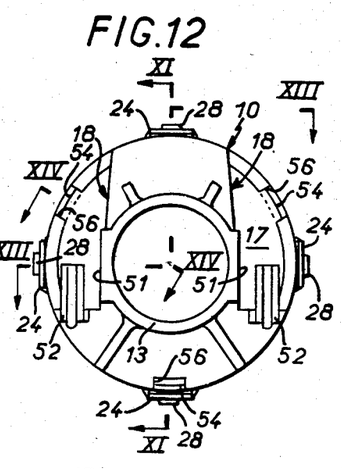
FIG. 12 shows an elevational view taken in the direction of arrow XII—XII in FIG. 11.
Figure 13:
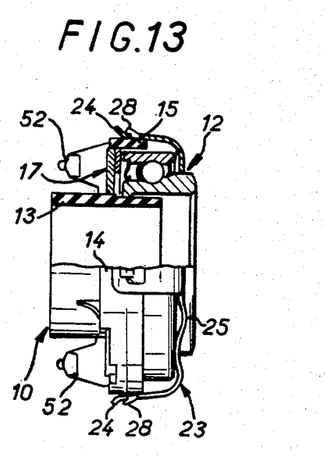
FIG. 13 shows a view partly in longitudinal section and partly in plan, taken on broken line XIII—XIII in FIG. 12.
Figure 14:
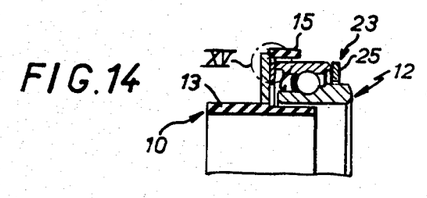
FIG. 14 shows a half sectional view taken on line XIV—XIV in FIG. 12.
Figure 15:
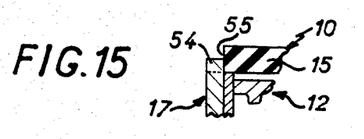
FIG. 15 shows on an enlarged scale the portion of FIG. 14 enclosed in phantom line XV.

In the embodiment shown in FIGS. 8-10, the axial projection for guiding the actuating member 11 is, as shown in FIGS. 1–4, oriented substantially tangentially to the inner periphery of flange 14 and the main edge 30 of corresponding passage 18 has at least one end which reaches the outer periphery of flange 14. In practice, the main edge 30 reaches the outer periphery of flange 14 at only one of its ends, the corresponding passage in the flange 14 being defined by the main edge 30 and a lateral edge 31, leaving aside the remaining part of the axial rim 15 of the flange 14.

Further, in this embodiment in which the release bearing is not adapted to be permanently in contact with the release mechanism of the clutch itself, there is associated with each passage 18 in flange 14 of the operating member a clip 40 for attaching the release bearing to the actuating member 11, the clip 40 being fastened to the release bearing is adapted to engage the actuating member 11.

According to a feature of this embodiment the clip 40 is adapted to be inserted between the bearing member 17 and the operating member 10. In practice, as the flange 14 of the operating member 10 has two passages 18, two clips 40 are provided, at opposed ends of a single part 41 having an intermediate portion 42 and inserted between the operating member 10 and the bearing member 17. In the illustrated embodiment the intermediate portion 42 is generally U-shaped and extends along the inner periphery of the bearing member 17 in a semicircular groove 43 in the operating member 10 at the inner periphery of the transverse flange 14. The intermediate portion 42 is continued by lateral branches 44 which extend to the outer periphery of the flange 14.

Each clip 40 comprises a U-shaped bend and its free end has an omega bend for bearing against the corresponding arm of the actuating member 11.

Thus each clip 40 extends partly on one side of the flange 14 of the operating member and partly on the other side thereof. It is simply resiliently clipped to the flange.

In the embodiments of FIGS. 11–18 the release bearing according to the invention comprises, as above, an operating member 10 adapted to be controlled by an actuating member, in practice an actuating fork, not shown, and a drive or thrust member 12 which is adapted in response to the operating member 10 to act on the release mechanism of the associated clutch, which is also not shown.

The operating member 10 is again formed of synthetic plastic material and is of one-piece construction comprising an axial sleeve 13 and a transverse flange 14. In accordance with the embodiments of FIGS. 11–18 the flange 14 is generally annular and is provided with an axial rim 15 at its outer periphery projecting toward the drive or thrust member side of the release bearing. For engagement with the actuating member a bearing member 17 is provided, formed as a simple metal washer disposed axially between the drive or thrust member 12 and the flange 14 of the operating member 10 with another washer 50 interposed therebetween.

For access by the actuating member to the bearing member 17 the flange of the operating member has symmetrically opposed local passages 18 each defined in part by an axial surface 31 on the sleeve 13 of the operating member 10 for guiding the actuating member and by a right angle portion 52 for axially maintaining the release bearing relative to the actuating member.

In the illustrated embodiments of FIGS. 11–18, as above, the drive or thrust member 12 comprises a ball bearing having an outer race 20 which alone is in axial contact with the bearing member 17 through washer 50 and through bearing member 17 against flange 14 of the operating member 10, and an inner race 21 free from all contact with any part of the release bearing which forms the active part of the drive or thrust member 12, i.e., the part which is adapted to bear against the release mechanism of the clutch itself.

Since, in practice, the release bearing is self-centering, the drive or thrust member 12 is mounted in contact with the washer 50 for radial shifting relative to the axis of the release bearing in a plane perpendicular to the axis, the shifting being limited by the axial rim 15 on flange 14 of the operating member 10 and/or the sleeve 13 thereof. In other words, the drive or thrust member 12 admits of limited shifting in all directions in a plane perpendicular to the axis of the release bearing relative to the axis.

As described above the axially coupling means for coupling the drive or thrust member 12 to the operating member 10 comprises a tabbed clip 23 comprising a plurality of four axial tabs 24, as shown, and an annular front wall 25. The axial tabs 24 of the clip 23 attaches it to hooks 28 on the operating member 10 and the annular front wall 25 which comprises an axially acting resilient Onduflex washer axially biases the drive or thrust member 12 towards the flange 14 of the operating member thereby maintaining the drive or thrust member 12 in contact with washer 50 which in turn is in contact with bearing member 17. Accordingly, the release bearing is a so-called permanently self-centering type release bearing.

On the side of the flange of the operating member remote from the drive or thrust member 12 the bearing member 17 is positively held in place by the flange. According to a feature of these embodiments the axial holding means are also associated with the bearing member 17 on the side of the flange 14 of the operating member 10 turned toward the drive or thrust member 12 for insuring the positive holding of the bearing member 17 in both directions.

In the embodiment of FIGS. 11–15 the axial holding means comprise at least two radial lugs 54 provided at the outer periphery of the washer defining the bearing member 17. A transverse shoulder 55 is provided for each lug 54 on the axial rim 15 of the flange 14 of the operating member 10 spaced from the flange 14, the transverse shoulders 55 being turned toward the flange 14, the radial lugs 54 being in contact with the respective shoulders.

As shown, for each of the axial lugs 54 on the bearing member 17 is provided a recess 56 in the axial rim 15 of the flange 14 of the operating member, flush with the flange. The transverse shoulders 55 on the axial rim 15 are formed at least in part by the actual edge of the axial rim 15. As shown, the recess 56 is not only in the axial rim 15 of the flange 14 of the operating member 10 but also in the flange 14 so that it opens axially on to the side of the flange 14 remote from the drive or thrust member 12. In the illustrated embodiment three such axial lugs 54 are provided on the bearing member 17. Two of the lugs are disposed in line with the passages 18 in the flange 14 of the operating member 10 so that the recesses 56 provided for the lugs 54 are also disposed in line with the passages 18 and open radially into the same. As for the third lug 54 of the bearing member 17 a special recess 56 is provided therefor.

As will be readily understood by the reader, the positioning of the washer comprising the bearing member 17 involves a detenting action thereof. The washer is inserted into the spaced defined between the sleeve 13 of the operating member and the axial rim 15 of the flange 14, and the lugs 54 cause transverse local resilient deformation of the axial rim 15 until they reach recesses 56 to which they are assigned and then come into engagement behind the edge of the axial rim 15. Then the washer defining the bearing member 17 is positively axially held, on one side by the flange 14 of the operating member and on the other side by the lugs 54 bearing against the edge of the axial rim 15 of the flange 14.

In the embodiment illustrated in FIGS. 15-18 the axial holding means for the bearing member 17 on the side of the drive or thrust member 12 comprises a web 58 which is formed in one piece with the rest of the operating member 10 and molded over at least part of the bearing member 17.

Figure 16:
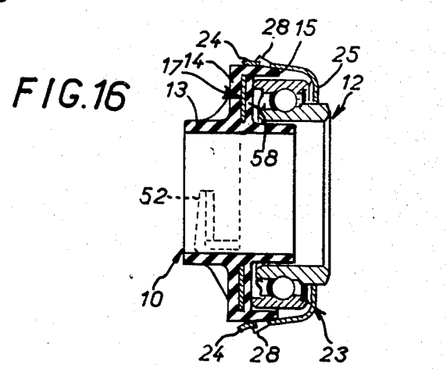
FIGS. 16 and 17 are respectively views similar to FIGS. 11 and 13 for yet another embodiment.
Figure 17:
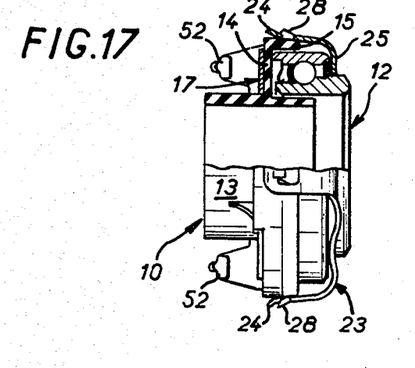

As illustrated in FIG. 16 the web 58 extends over the entire bearing member 17 on the drive or thrust member side so that it comprises on its own a washer like portion interposed between the drive or thrust member 12 and the bearing member 17.

Figure 18:
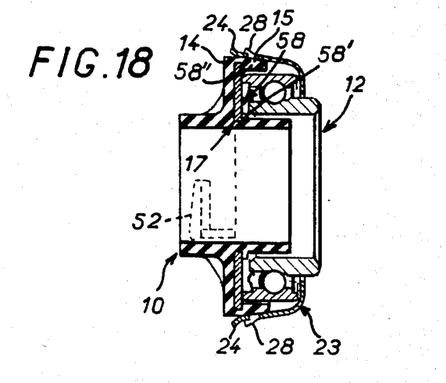
FIG. 18 shows a similar view to that of FIG. 11 for another embodiment.

Alternatively, as shown in FIG. 18, the web is reduced to a mere shoulder 58' which engages the inner periphery of the bearing member 17 and a shoulder 58" which is formed by the axially inner end of the axial rim 15 on the flange 14 of the operating member 10 and radially extends over the outer periphery of the bearing member and in direct contact with the same.

Obviously the present invention is not intended to be limited to the various described and illustrated embodiments but on the contrary admits of variations, alternatives and modifications without departing from the scope of the invention are defined by the appended claims.

In the illustrated embodiments the washer which comprises the bearing member is absolutely flat but this is not mandatory. As shown for example in phantom lines in FIG. 6, it may comprise one or more discrete bosses axially extending into the corresponding passages in the flange of the operating member for securing the bearing member against rotation relative to the flange in order to reduce wear and/or avoid possible interference with the frictional conditions affecting the shifting of the drive or thrust member as well as for engagement with the actuating member.

Although the inner race of the ball bearing is the rotating part in the illustrated embodiments, as an alternative the outer race may engage the clutch release mechanism of the clutch and therefore rotate.

The field of use of the invention is not limited to self-centering release bearings but includes all types of clutch release bearings.

In any event the reader will appreciate that the invention advantageously permits the use of a standard plate or washer as the bearing member together with the axial length of the ball bearing forming the drive or thrust member and/or the thickness of the overlying web if any or added thickness of the washer having a holding function, if employed, to accommodate the axial distance between the bearing member from the free end of the drive or thrust member to the requirements of the particular specifications.

What is claimed is:

1. A clutch release bearing comprising a plastic operating member having a transverse flange and being adapted to be controlled by an actuating member, a metal bearing member engageable with the actuating member, a drive or thrust member adapted to coact with a release mechanism of an associated clutch in response to said operating member, coupling means for axially coupling said drive or thrust member to said operating member, said metal bearing member being disposed axially between said drive or thrust member and said transverse flange of said operating member, said transverse flange having discrete access passages providing access for the actuating member to said metal bearing member, said metal bearing member consisting of a substantially flat washer, said coupling means urging said thrust or drive member axially toward the side of said bearing member axially remote from said transverse flange.

2. A release bearing according to claim 1, comprising an axial projection extending along at least part of at least one of the edges of each of said passages in said transverse flange, said axial projection defining means for guiding the actuating member.

3. A release bearing according to claim 2, said release bearing having an axial plane of symmetry, wherein said axial projection extends tangentially to the inner periphery of said transverse flange parallel to said axial plane of symmetry.

4. A release bearing according to claim 2, said release bearing having an axial plane of symmetry, wherein said axial projection extends substantially tangentially to the outer periphery of the flange parallel to said plane of symmetry.

5. A release bearing according to claim 2, said release bearing having an axial plane of symmetry, wherein said axial projection extends chordally of said flange and perpendicularly to the axial plane of symmetry.

6. A release bearing according to claim 2, wherein said axial projection has a right angle portion spaced from and parallel to said flange.

7. A release bearing according to claim 6, wherein said axial projection extends along at least two adjoining edges of each of said passages, and a connecting wall interconnects said right angle portion on one of said axial projections with another of said axial projections.

8. A release bearing according to claim 1, said release bearing having an axial plane of symmetry, wherein at least one edge of each of said passages perpendicular to said plane of axial symmetry has a chamfer.

9. A release bearing according to claim 1, wherein said bearing member has at least one local boss extending axially into a corresponding passage in said flange of said operating member.

10. A release bearing according to claim 1, wherein said bearing member comprises at least one radial protuberance.

11. A release bearing according to claim 1, said thrust or drive member comprising a ball bearing, the inner race of the ball bearing defining radial clearance with the operating member, said coupling means axially biasing said ball bearing against axially toward said bearing member, said ball bearing being adapted to be displaced in a plane transverse to the axis of the clutch release bearing so as to obtain a centered position.

12. A release bearing according to claim 1, wherein one race of said ball bearing is in engagement with the side of said bearing member opposite the side engageable by the actuating member.

13. A release bearing according to claim 1, wherein axial holding means are associated with said bearing member on the side of said flange turned toward the drive or thrust member, said axial holding means comprising a web molded in one piece with said operating member over at least part of said bearing member.

14. A release bearing according to claim 13, wherein said web is molded over an entire side of said bearing member.

15. A release bearing according to claim 13, wherein said web comprises a mere shoulder running along at least one of the peripheries of said bearing member.

16. A release bearing according to claim 1, further comprising axial holding means associated with said bearing member on the side of said flange turned toward said drive or thrust member, said flange having an axial rim at its outer periphery, said axial holding means comprising at least two radial lugs at the outer periphery of the said bearing member, a transverse shoulder on said axial rim spaced from said flange and for engagement with each of said radial lugs.

17. A release bearing according to claim 16, wherein a recess is formed at the edge of said axial rim, said transverse shoulder in said axial rim being formed at least partly by the said edge of said axial rim.

18. A release bearing according to claim 17, wherein said recess is also formed in said flange and axially opens on to the side of said flange remote from said drive or thrust member.

19. A release bearing according to claim 18, wherein there are three said lugs on said bearing member.

20. A release bearing according to claim 19, where two of said recesses in the edge of said axial rim of said flange are in alignment with and open radially into said passages.

21. A clutch release bearing comprising a plastic operating member having a transverse flange and being adapted to be controlled by an actuating member, a metal bearing member engageable with the actuating member, a drive or thrust member adapted to coact with a release mechanism of an associated clutch in response to said operating member, coupling means for axially coupling said drive or thrust member to said operating member, said metal bearing member being disposed axially between said drive or thrust member and said transverse flange of said operating member, said transverse flange having discrete access passages providing access for the actuating member to said metal bearing member, said metal bearing member being a substantially flat washer, an axial projection extending along at least part of at least one of the edges of each of said passages in said transverse flange, said axial projection defining means for guiding the actuating member, said release bearing having an axial plane of symmetry, said axial projection extending substantially tangentially to the inner periphery of said transverse flange parallel to said axial plane of symmetry, and at least one of the ends of said edges of said passages adjoining said one edge extending to the outer periphery of said flange.

22. A clutch release bearing comprising a plastic operating member having a transverse flange and being adapted to be controlled by an actuating member, a metal bearing member engageable with the actuating member, a drive or thrust member adapted to coact with a release mechanism of an associated clutch in response to said operating member, coupling means for axially coupling said drive or thrust member to said operating member, said metal bearing member being disposed axially between said drive or thrust member and said transverse flange of said operating member, said transverse flange having discrete access passages providing access for the actuating member to said metal bearing member, said metal bearing member being a substantially flat washer, an axial projection extending along at least part of at least one of the edges of each of said passages in said transverse flange, said axial projection defining means for guiding the actuating member, said axial projection extending along at least two adjoining edges of each of said passages.

23. A clutch release bearing comprising a plastic operating member having a transverse flange and being adapted to be controlled by an actuating member, a metal bearing member engageable with the actuating member, a drive or thrust member adapted to coact with a release mechanism of an associated clutch in response to said operating member, coupling means for axially coupling said drive or thrust member to said operating member, said metal bearing member being disposed axially between said drive or thrust member and said transverse flange of said operating member, said transverse flange having discrete access passages providing access for the actuating member to said metal bearing member, said metal bearing member being a substantially flat washer, and a clip for attaching said release bearing to the actuating member associated with each of said passages in said flange of said operating member, said clip being partly inserted between said bearing member and said operating member.

24. A release bearing according to claim 23, wherein the clip part inserted between said bearing member and said operating member extends along the inner periphery of said bearing member.

25. A release bearing according to claim 24 or 23 wherein a pair of clips for each of said passages are formed at the ends of a part, an intermediate portion of said part being said clip part inserted between said operating member and said bearing member.

* * * * *